United States Patent [19]
Bailey et al.

[11] 3,899,280
[45] Aug. 12, 1975

[54] SWAGING UNIT FOR THERMOPLASTIC PIPE

[75] Inventors: John M. Bailey, Elk River; Richard C. Longfellow, Long Lake, both of Minn.

[73] Assignee: The Cretex Companies, Inc., Elk River, Minn.

[22] Filed: June 5, 1973

[21] Appl. No.: 367,142

[52] U.S. Cl. .................... 425/393; 65/277; 65/283; 65/282; 264/290 R
[51] Int. Cl.² ......................................... B29C 17/07
[58] Field of Search ......... 425/392, 393; 264/290 R; 65/277, 282, 283

[56] References Cited
UNITED STATES PATENTS

| | | | |
|---|---|---|---|
| 3,205,535 | 9/1965 | Niessner et al. | 425/393 X |
| 3,425,093 | 2/1969 | Ansette | 425/393 X |
| 3,484,900 | 12/1969 | Sands et al. | 425/393 |
| 3,677,684 | 7/1972 | Platz | 425/393 |
| 3,732,054 | 5/1973 | Lyng | 425/393 |

Primary Examiner—Robert L. Spicer, Jr.
Attorney, Agent, or Firm—Dorsey, Marquart, Windhorst, West and Halladay

[57] ABSTRACT

A swaging unit for forming a gasket groove and a bell in the end of a thermoplastic pipe. The unit includes a belling die to form the bell on the end of the heat softened thermoplastic pipe and a gasket groove forming unit which in part consists of a nonelastomeric radially expandable groove forming apparatus. Translating cones, the extent of travel of which may be precisely controlled, are utilized to expand the groove forming means. Methods of latching and linking the translating cones to moving means are disclosed which allows a variation of methods of forming gasket grooves in the finished thermoplastic product. In addition, the translating cones and gasket forming apparatus are readily detachable and interchangeable for variation in pipe size or contour of the gasket groove formed.

18 Claims, 9 Drawing Figures

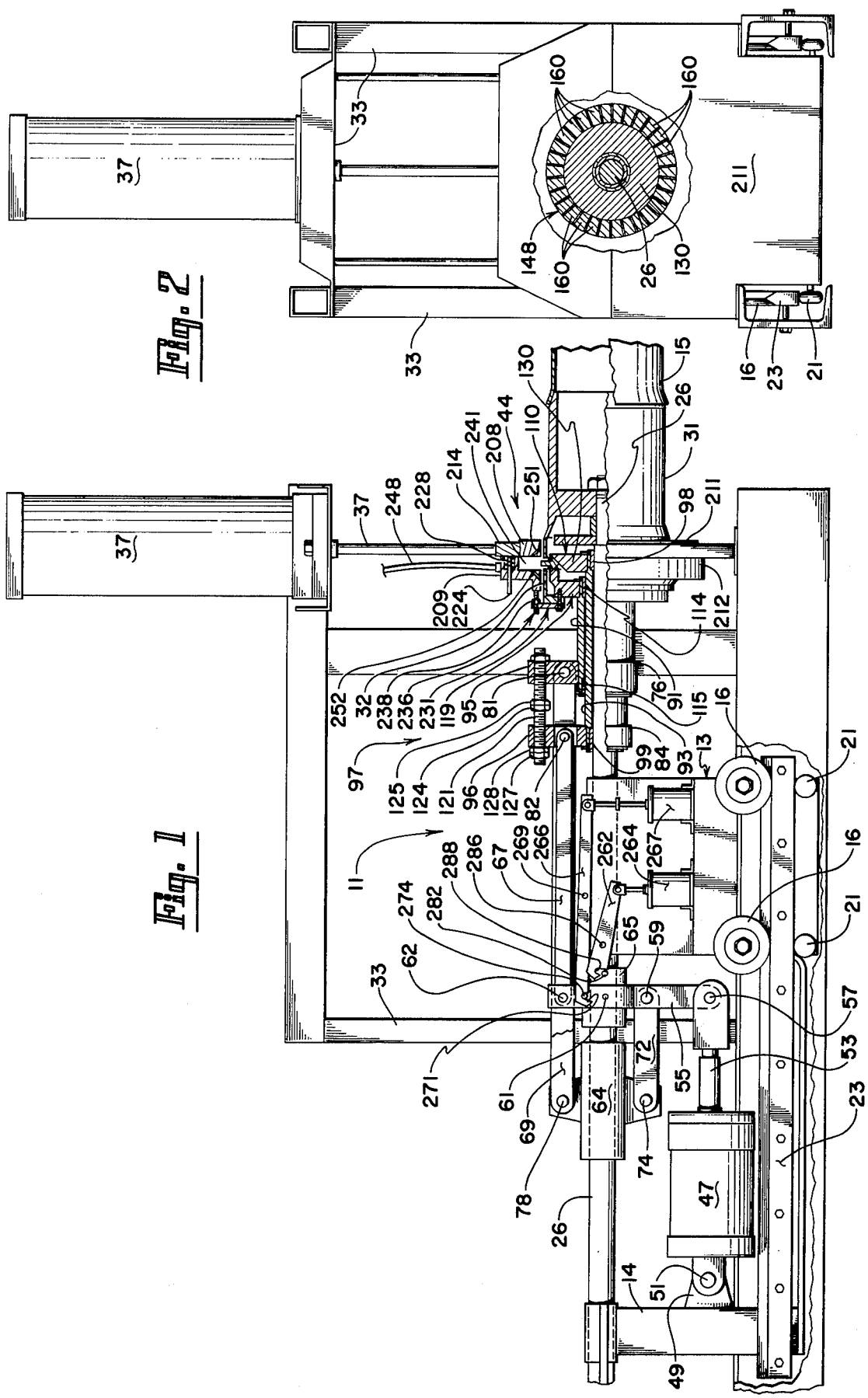

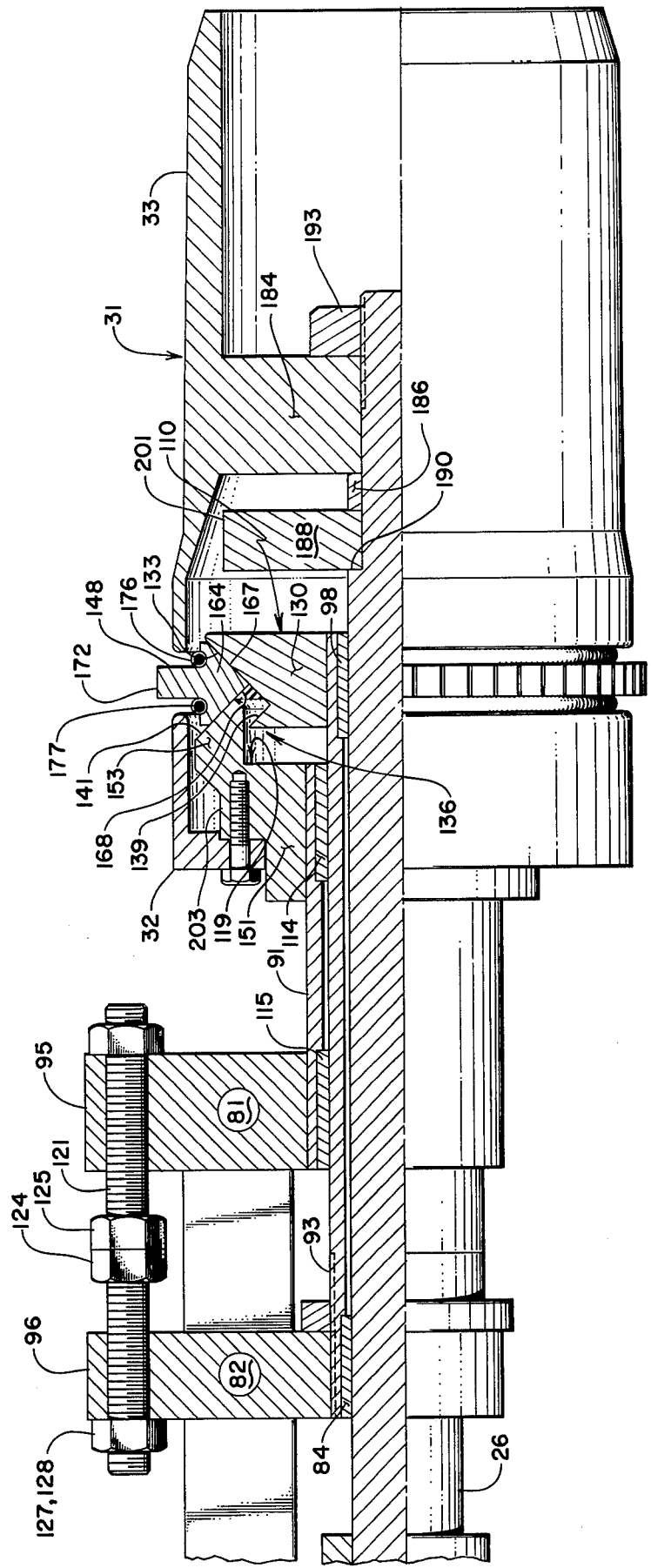

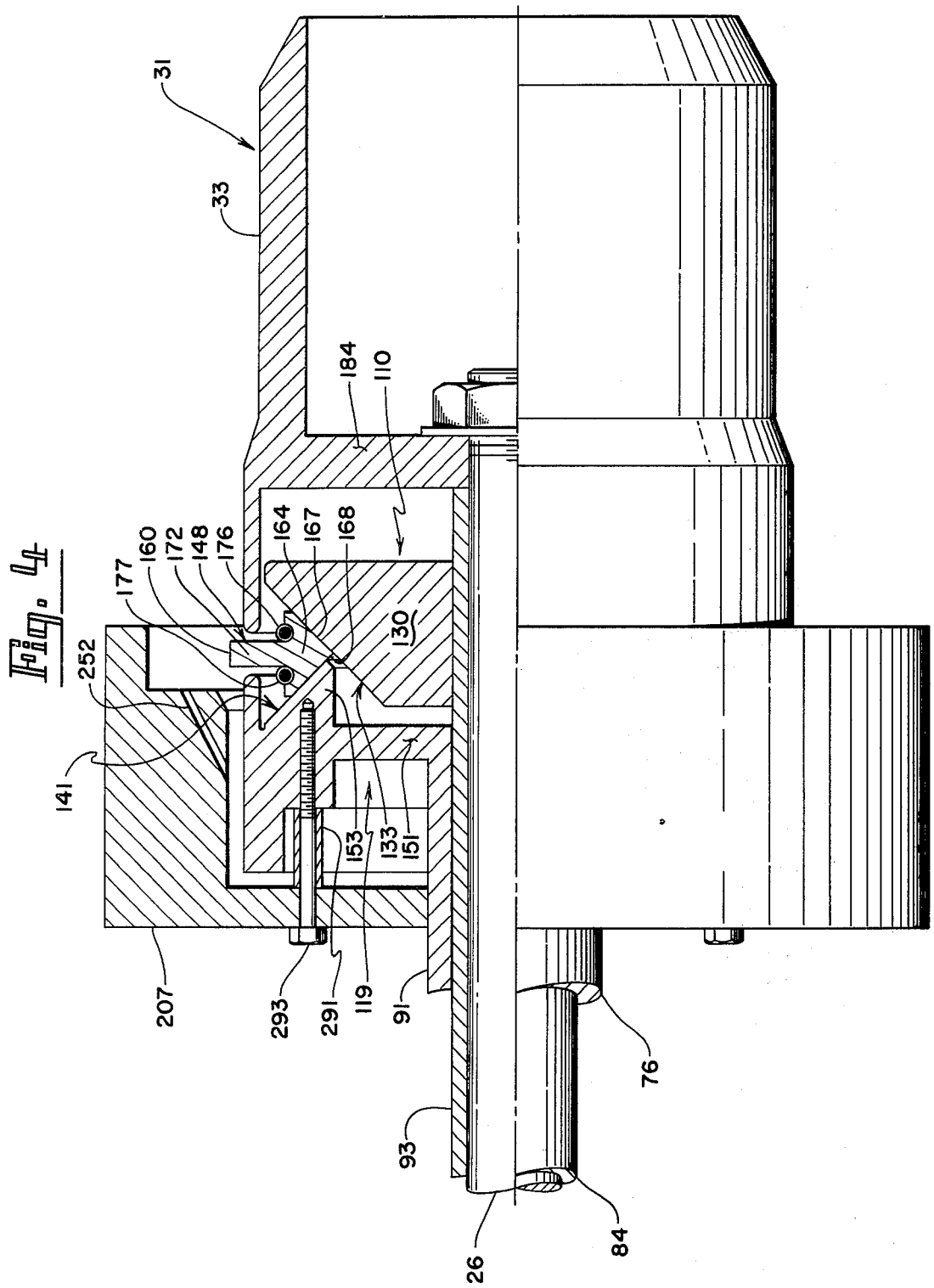

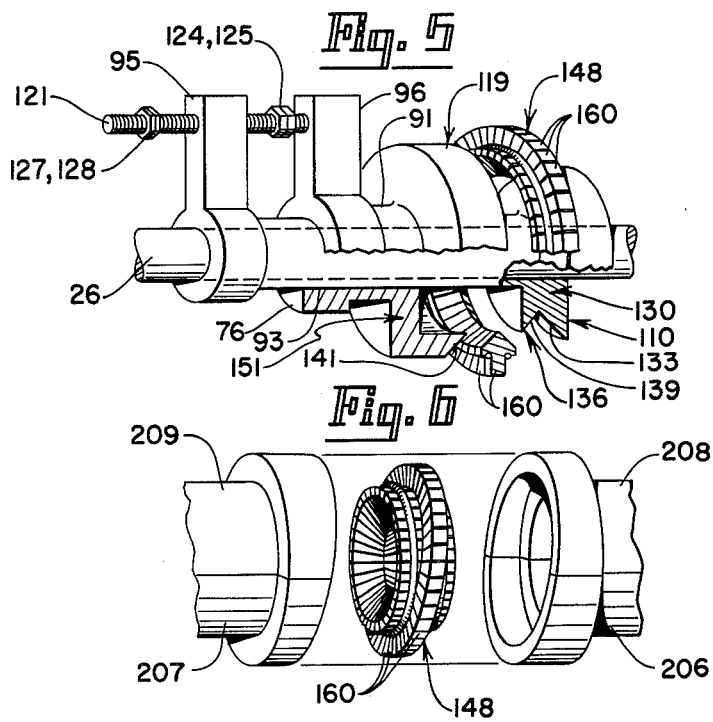
Fig. 5
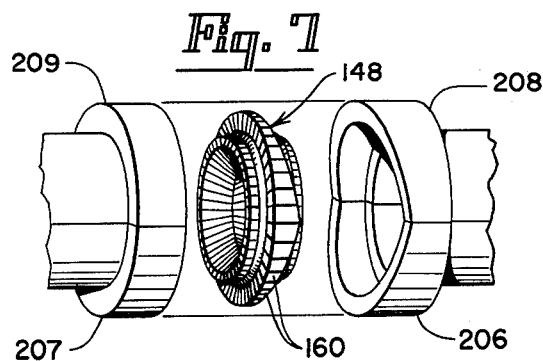
Fig. 6
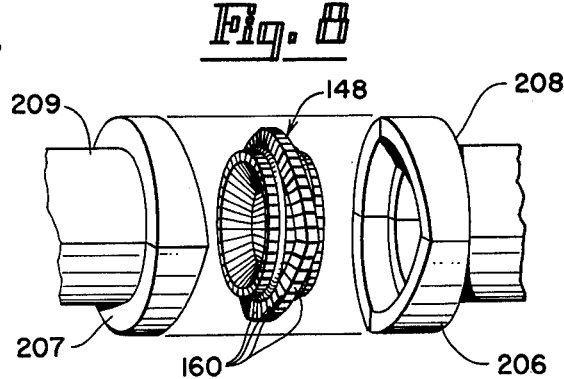
Fig. 7
Fig. 8
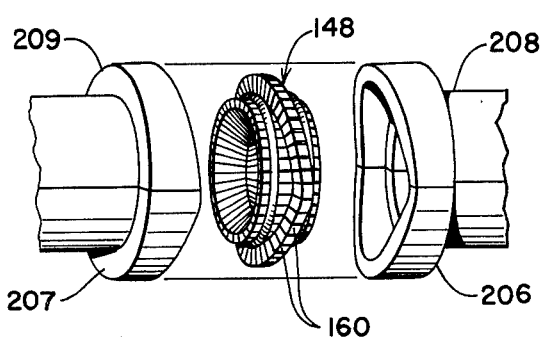
Fig. 9

SWAGING UNIT FOR THERMOPLASTIC PIPE

BACKGROUND OF THE INVENTION

Gasket grooves have been formed for many years in thermoplastic piping and other piping by a number of methods. Readily located in the prior art are pivotally and radially expandable mandrels, a number of rotatable spinning devices, and a number of methods of compressing or expanding elastomeric rings into softened thermoplastic piping to form a gasket groove therein.

In the aforementioned prior art it has been conventional to locate a mold of the desired outer dimensions of the molding ring around the area to be formed. Thereafter expansion or compression of the elastomeric material or mandrel means is performed to mold the gasket groove into the desired shape.

It should be obvious that a noteable disadvantage of the prior method of forming gasket grooves in thermoplastic pipe is the effect of variations in wall thickness of the portion of the pipe being formed. If the outer dimensions are precisely controlled and limited by the mold, any variation in wall thickness must of necessity become a variation in the inner diameter of the gasket groove. Therefore, particularly where an elastomeric ring is utilized, the resiliency of the ring forming the inner diameter of the gasket groove will accommodate any variation of wall thickness while the generally more solid surface of the molding means prevents variations on the outer diameter.

SUMMARY OF THE INVENTION

Applicant's invention is uniquely designed to precisely control the inner diameter of the gasket groove to be formed. This is accomplished in part with a non-resilient nonelastomeric means for forming the gasket groove. In addition, formation of the gasket groove, that is the extent of outward travel of the gasket forming means, is precisely controlled with translating and stop means so that internal tolerance levels may be obtained on the order of plus or minus 0.010 inch, well within the requirements of any applicable specification. This is accomplished by utilizing translating cones to radially expand a unitized ring of gasket groove forming segments. Since no molding means are provided or required the outward travel of the outer wall of the gasket groove during formation can be and is in the present invention, precisely controlled to give precise tolerances to the inner diameter of the gasket groove. As should be understood this greatly reduces or eliminates rejects and assures high quality finished products.

Means are provided as a part of the invention to vary the method of forming the gasket groove with the aforementioned apparatus. Latching and linking means are provided which enable both radial and axial movement of the gasket groove forming means which assures that for certain products, such as pressurized pipe, that localized stretching of the pipe and consequent diminishing of wall thickness is minimized or eliminated when swaging or forming the gasket groove. In other words, the softened thermoplastic piping is shaped rather than stretched into the desired form, thus eliminating defects and weaknesses in the finished product.

Finally, because of the flexibility of the apparatus due to the use of detachable mandrels and translating means, various contoured gasket grooves may be formed by simply replacing the gasket groove forming means. This may be done to accommodate different pipe sizes, to provide a different depth of gasket groove to be formed, or to form different shapes or contours of the gasket groove. Advantages of varying the contour of the gasket groove are described in U.S. Pat. application Ser. No. 309,430 filed Nov. 24, 1974.

DESCRIPTION OF THE DRAWINGS

FIG. 1 is an elevational side view partly in section showing our invention;

FIG. 2 is an elevational end view partly in section taken along the line 2—2 in FIG. 1;

FIG. 3 is an expanded view of a portion of the apparatus shown in FIG. 1 showing particularly the construction of the swaging unit;

FIG. 4 is an alternative embodiment of the swaging unit wherein the upper and lower rear ward cooling rings are secured to the rearward translating means;

FIG. 5 is a perspective view of the translating means partially broken away to show details of the interrelationship of the parts; and FIGS. 6–9 show variations of the gasket groove forming portions of the segmental ring to enable formation of multiplaner, curvilinear or tilted gasket grooves or a gasket groove having a progressive taper.

DESCRIPTION OF THE PREFERRED EMBODIMENT

The swaging unit 11 which is our invention is shown generally in FIG. 1. A carriage 13 is provided so that the swaging unit 11 can be inserted into heat softened thermoplastic pipe 15 shown on the right of FIG. 1. Mobility and alignment of the carriage 13 is provided by slotted wheels 16, and holding wheels 21 which allow the carriage 13 to be withdrawn and inserted on properly positioned rails 23. Fixedly secured to the frame 14 of the carriage and transversing its length is a shaft 26. On the forward end of the shaft 26, as observed from the end which is inserted into the thermoplastic pipe 15, is the swage mandrel 31 which forms a bell on the end of the piping 15. A rear mandrel 32 is also provided, slidably mounted on shaft 26, which acts as an extension of mandrel 31 to form the remaining portion of the bell between the gasket groove and the end of the pipe. Frame members 33 also support a pneumatic cylinder 37 which is utilized to raise and lower the upper half of a split cooling ring 44 as more fully described below.

Motive or actuating means are preferably provided by a pneumatic cylinder 47 which is rigidly and securely attached to the carriage 13 by a tab 49 and pin 51 connection. The ram portion 53 of the pneumatic cylinder 47 is pivotally connected to an actuating lever 55 with a pin connection 57. Also on the actuating lever 55 are two additional pin connections 59, 61 which connect the actuating lever 55 to two sliding blocks 64, 65. Both rearward and forward sliding blocks, 64 and 65, respectively, are slidably mounted on the shaft 26. One of the pins 61 is rigidly connected to the forward sliding block 65 to enable the other two pin connections 59, 62, which are operatively connected to actuating links 67, 69 to move in opposite directions upon actuation of the pneumatic ram 53.

The first pin connection 59 pivotally connects the actuating lever 55 to a connecting link 72 which is secured by a pin connection 74 to the rearward sliding block 64. The rearward sliding block 64 is operatively connected to the forward actuating link 69 and the forward sliding sleeve assembly 76, discussed below, by a pin connection 78. The second additional pin connection 62 on the actuating lever 55 is pivotally connected to the other actuating link 67 which is detachably secured on its other end by a pin connection 82 to the rearward sliding assembly 84. Thus, retraction of the ram 53 from the position shown in FIG. 1 moves pin connection 59 to the left and thus sliding block 64 to the left and sliding sleeve assembly 76 to the left while pin connection 62 moves to the right and thus sliding sleeve assembly 84 moves to the right, as viewed in FIG. 1. As shown in the drawings, both sliding blocks 64 and 65 are slidably mounted on the shaft 26 although the forward sliding block 65 may be firmly latched so that it is not movable during one mode of operation.

The forward and rearward sliding sleeve assemblies, 76 and 84 respectively, comprise annular sleeve members, 91 and 93 respectively, which are fixedly secured, as by welding, to tab stops, 95 and 96 respectively, which comprise in part control or stop means 97 to provide proper tolerance in the finished product.

The rearward sleeve assembly 84 encases the shaft 26 and is supported on each end thereof by annular bearings, 98 and 99 respectively. Fixedly secured to the forward end of the rearward sleeve assembly 84 is a forward translating cone 110, described more fully below.

Similarly, the forward sleeve assembly 76 comprises a tab stop 95 and an annular sleeve member 91 which encases the sleeve member 93 of the rearward sleeve assembly 84 and is supported on each end thereof by bearing surfaces, 114 and 115 respectively. Fixedly secured to the forward end of the forward sleeve assembly 76 is the rearward translating cone assembly 119.

The control or stop means 97 comprise a threaded shaft 121 which is fixedly secured to the tab stop 95 on the forward sleeve assembly 76. The threaded shaft 121 extends slidably through the tab stop 96 of the rearward sleeve assembly 84. Stop nuts 124, 125 are threaded onto the threaded shaft 121 at a suitable point between the tab stops 95, 96 which provides the limit of travel for contraction of the apparatus 11. Stop nuts 127, 128 are also provided on the shaft 121 beyond the rearward tab stop 96 to provide a set point for the limit of travel for maximum expansion.

As shown most clearly in FIGS. 3 and 5 the forward translating cone 110 comprises an annular member 130 whose outermost surface 133 is geometrically shaped and inclined relative to the longitudinal axis. While shown as a conical surface, which is the preferred embodiment, it should be understood that any suitable geometric surface could be utilized which enables proper operation of the invention as described. As shown the forward translating cone 110 also includes a lip portion 136 having an outer surface 139 which is inclined at the same slope as the outer surface 141 of the rearward translating cone 119. This lip 136 simply assures that when the translating means and segmental ring 148 are fully contracted that the segmental ring 148 is contained between the translating cones 110, 119.

The rearward translating cone 119 also comprises an annular member 151 having an outermost or operating surface 141 preferably inclined at an opposite angle to the longitudinal axis. As shown, the portion 153 having the translating surface 141 is constructed so that it clears the lip 136 on the forward translating cone 110 during expansion of the segmental ring 148. This enables full expansion of the segmental ring 148 when the translating cones 110, 119 move together to expand the ring 148.

The segmental ring 148 comprises a plurality of segments 160, each with a cross section as best shown in FIGS. 3 and 4. Each segment 160 has a translating portion 164 having translating surfaces 167, 168 geometrically compatible with the translating surfaces 133, 141 of the translating cones 110, 119 and a gasket groove forming portion 172 centrally located relative to the translating portion 164 and elongated radially outward for formation of the gasket groove when fully expanded.

To contain the segments 160 within the cavity provided between the translating cones 110, 119 and to retract the gasket groove forming portion 172 from the thermoplastic pipe 15 during contraction of the translating means, garter springs 176, 177 are provided in cavities located adjacent the sides of the gasket groove forming portions 172 of the segments 160. It has been found that due to the plasticity of the thermoplastic pipe 15 in the softened condition, a smooth inner surface of the gasket groove will be formed even though when fully expanded circumferential gaps (not shown) exist between adjacent segments 160 in the segmental ring 148.

Alignment of the swage mandrel 31 with the gasket groove forming means is provided by bolting the rearward portion 32 of the swage mandrel 31 to the rearward translating cone. The forward portion 33 of the swage mandrel 31 is mounted on an annular unit mounting plate 184 and fixedly spaced from the forward translating cone 110 by an annular spacer 186 and an annular bulkhead 188 which abuts a shoulder 190 formed in the shaft 26. Retention on the shaft 26 is provided by a lock nut 193 which is threadably secured to the shaft 26. While not shown, protection from contaminants in certain environments can be provided by any suitable resilient membrane attached between the outermost surface 201 of the bulkhead 188 and the rearward portion 203 of the rearward translating cone 119. This membrane can be secured by any suitable means such as radiator type hose clamps.

Cooling means 44 for the thermoplastic piping 15 are provided by split front and rear cooling rings 206–209. The lower half 211, 212 of a cooling ring housing 214, in which the lower halves 206, 207 of the cooling rings 44 are contained, is rigidly mounted to the base frame on which the carriage 13 rolls. The housing 214 for the upper halves 208, 209 of the cooling rings 206–209 is secured to a pneumatic cylinder 37 as shown in FIG. 2. As shown, the front upper cooling ring 208 is secured to the housing 214 in radial alignment therewith. The rear upper and lower cooling rings 207, 209 are slidably mounted on a plurality of pins 224 rigidly secured to the rear of the housing 214. A compression spring 228 is located about each pin 224 and is contained in pin cavities in the rear cooling rings 207, 209. The compression springs 228 tend to part the cooling rings 207, 209 from the cooling ring housing 214 after the gasket groove has been formed. Rigidly secured by bolting or other suitable means to the rearward translating cone 119 is an annular mounting plate 231 which supports adjustable stops. The adjustable stops comprise threaded shafts 236 and stop nuts 238 which are located circumferentially around the rear cooling rings 207, 209 and assure proper positioning of the swaging means relative to the cooling rings 206–209 and proper alignment of the gasket groove forming means relative to the cooling channel 241.

After formation of the bell and gasket groove intense cooling is provided through the cooling channel 241. Water is injected through a cooling water inlet tube 248 which immerses the gasket groove. A plurality of cooling channels 251, 252 drilled through the forward and rear cooling rings 206–209 immerse the bell portion of the thermoplastic pipe. Cooling is continued until the piping becomes rigid.

The modes of operation of the apparatus, as described above, can be modified depending upon the product use of the thermoplastic piping 15. For non-pressurized piping formation of a gasket groove with varying wall thickness is acceptable and radial expansion only is sufficient.

For pressurized pipe, however, uniform wall thickness is a critical specification. For these purposes provision is made to translate both axially and radially. Specifications require that the ratio of pipe outer diameter to wall thickness cannot exceed a specified maximum value throughout the barrel and joint section of the pipe. Therefore, in the joint section and gasket groove section the wall thickness must increase proportionally to the increase in diameter. Also, there can be no localized proportion of the wall thinner than the minimum thickness determined by this ratio. To provide sufficient wall thickness in the joint, the extrusion line haul-off can be controlled to slow the extrusion line to cause increased wall thickness for the joint section of the pipe 15. Alternatively, methods of thickening the wall of the pipe 15 may also be employed such as adding a special sleeve of thermoplastic material prior to forming. Axial and radial operation of the invention may be accomplished as follows.

With pneumatic cylinder 37 retracted and the upper cooling ring housing 214 and upper rear and forward cooling rings 208, 209 raised the pipe section 15 is supported concentrically in the lower cooling rings 206, 207. Latch 262, discussed below, activated by solenoid 264 is disengaged and latch 266 is actuated by solenoid 267. Latch 266 is rotatably secured to the carriage by a pivot pin connection 269. The engaging slot 271 of latch 266 engages a pin 274 which is fixedly secured to the actuating lever 55. Cylinder 37 is activated which lowers the upper cooling rings 208, 209 into placy to form a complete circular ring around the pipe section 15. Carriage 13, including the swage head 31, is rolled forward and the swage head 31 enters the pipe 15, swaging a bell socket in the pipe 15.

Cylinder 47 extends, causing actuating lever 55 to rotate about pin 274 which extends the segments 160 radially while translating them axially in a forward direction simultaneously. The pin 274 is preferably located a predetermined distance pins 59 and 62 depending on the desired ratio of radial translation to axial translation. Forward axial motion of the segments 160 as they extend radially, along with forward axial motion of the rear cooling ring 207, 209 and equivalent forward motion of mandrel 32 is designed to minimize or eliminate localized stretching of the pipe and consequent diminishing of wall thickness. Stops 236 push ring 207, 209 forward. Mechanical stop 121 limits travel of the cones 110, 119 and the actuating linkage 91, 93 for proper and precise concentric position of the segments 160 in relation to the swage 31. Water cooling is then supplied through inlet 248 to the hot section of the pipe 15.

When the plastic is rigid, solenoid 267 retracts, unlatching pin 274. Solenoid 264 extends, latching the latch 262 to a pin 282 which is rigidly attached to sliding block 65. Cylinder 47 retracts rotating link 55 about pin 61. Thereafter the rear cone 119 translates rearward and the front cone 110 translates forward. The segments 160 being carried between the translating cones 110, 119 retract radially until the travel of the opposing cones 110, 119 is limited by mechanical stop 121. The stops 236 travel rearward with the rear cone 119. Springs 228 force ring 207, 209 to slide rearward on pins 224. Solenoid 264 is then retracted unlatching latch 262 from pin 282. Cylinder 47 retracts further, sliding the entire linkage 55, blocks 64, 65, and both sliding sleeve assemblies 76, 84 rearward until pin 274 strikes the jaw 271 of latch 266. Latch 266 is closed by extending solenoid 267. The carriage 13, shaft 26, and swage head unit 31 are retracted rearward to remove the swage from the pipe. The gasket groove and bell on the pipe 15 is complete at this time.

Thereafter the water flow for cooling is shut off and cylinder 37 retracts raising the cooling ring housing 214 and upper cooling rings 208, 209 so that the pipe 15 can be removed. The pipe 15 is removed from the lower housing and cooling rings 206, 207 and a new pipe with a heated joint section is dropped into place. The cycle can then be repeated. An alternative embodiment may be utilized which also enables axial translation of the cooling ring 207, 209 along with the translating cones 110, 119. As shown in FIG. 4 the rearward cooling ring 207, 209 may be spaced from the rearward translating cone 119 with annular spacers 291 and bolted to the rearward translating cone 119 with bolts 293. Since the rearward cooling ring 207, 209 is then mounted directly on the forward sleeve assembly 76 it provides complete and uniform axial translation during expansion and contraction of the gasket groove forming means.

The latching means can also be utilized to alter the mode of operation of the apparatus so that gasket grooves can be formed by radial expansion only. Referring again to FIG. 1, if radial movement only is desired, latch 262 is actuated by solenoid 264. Latch 266 is disengaged with solenoid 267. Latch 262 is rotatably secured to the shaft 26 by pivot pin connection 286. The engaging slot 288 of latch 262 engages the pin 282 which is rigidly secured to the forward sliding block 65. When engaged the sliding block 65 remains stationary during operation and the actuating lever 55 rotates about pin 61. Since pins 59 and 62 are located equal distances from pin 61, equal and opposite movement is imparted to the translating cones 110, 119 to move the gasket groove forming means 160 radially into the thermoplastic pipe.

As above, operation is simply reversed to withdraw the gasket groove forming portions 160 from the thermoplastic pipe 15 and the swage unit 31 is withdrawn prior to inserting another section of pipe 15.

Since the construction of this invention is such that the translating cones 110, 119 and sliding sleeve assemblies 76, 84 are operatively secured to the carriage shaft 26 by a threaded connection 193 in FIG. 3, alternative gasket groove depths or contours may be conveniently formed with this apparatus. In addition, the swage mandrel 31 and cooling rings 206–209 may also be replaced to accommodate different pipe sizes. Due to the unitary construction and operation, after the lock nut 193 is removed from the shaft 26, removal of detachable pins 81 and 82 enables removal of the translating cones 110, 119 and sliding sleeve assemblies 76, 84 as one assembly by simply sliding it off the shaft 26. Therefore, the stop means 97 may remain calibrated in storage with no recalibration required when reassembled. By simply replacing the cooling rings 206–209 and swage mandrel 31 along with the gasket groove forming means 160 different pipe sizes may be easily accommodated. The shaft 26 may also be constructed as two portions, the rear end of which should be permanently affixed to the carriage 13. With this design the forward end is detachably secured to the carriage 13 and becomes a permanent component of the entire head assembly. Thereafter to detach the complete head assembly all that is necessary is to detach the shaft and pull pins 81 and 82 as discussed above.

Alternative contours for gasket grooves such as a gasket groove inclined relative to the longitudinal axis or a gasket groove with a progressive taper may be obtained with cooling rings 206–209 and gasket forming means 148 similar to those shown in FIGS. 6 and 7. Except for the modification to the segmental ring 148 and cooling rings 206–209 the apparatus is structurally identical to the basic apparatus and is numbered accordingly. Similarly, gasket groove forming means may be employed to create multiplaner or culvilinear contoured gasket grooves such as shown in FIGS. 8 and 9 and each variant is part of our invention. The advantages of such contoured gasket grooves are more fully described in co-pending Patent application Ser. No. 309,430 filed Nov. 24, 1972 now U.S. Pat. No. 3,831,954.

The above described invention is a simple, nonexpensive and noncomplex apparatus which provides a tolerance accuracy of plus or minus 0.010 inches in the inner diameter of the gasket grooves so formed. Expansion of the gasket groove forming means 172 beyond the swage mandrel 31 can be controlled to within plus or minus 0.005 inches. This provides a joint which requires minimum gasket compression for a reliable joint. Consequently, greater ease of assembly is provided due to the reduction in force necessary to insert the spigot into the bell.

While the preferred embodiment has been described above, it is understood that variations can be made and still be within the scope of this invention.

We claim as our invention the following:

1. In a swaging unit for forming a bell and a gasket groove having an inner diameter in heated thermoplastic piping of the type having swage mandrel means having a forward end and a rearward end and a circumferential gap therebetween for inserting into the thermoplastic pipe to form a bell on one end thereof;

gasket groove forming means having a portion which may be radially extended through the circumferential gap in the swaging head while the swage mandrel is positioned in the pipe; and translating means for expanding the gasket groove forming means through the circumferential gap to form the gasket groove in the thermoplastic pipe;

the improvement wherein the gasket groove forming means comprise:

a plurality of nonelastic segments formed from a rigid material the segments being at all times coaxially and circumferentially aligned each with the other, each segment having gasket groove forming edges and being positioned relative to the translating means so that axial movement of the translating means expands the gasket forming portions of the segments radially in continuous coaxial and circumferential alignment through the circumferential gap and into the softened thermoplastic pipe to form the gasket groove in the pipe; and further comprising control means operatively connected to the translating means to precisely control the extent of translation whereby the outward radial expansion of the segments and thus the inner diameter of the gasket groove so formed is precisely controlled.

2. The improvement of claim 1 wherein the coaxially and circumferentially aligned segments form an expanding ring and wherein the plane of at least one edge of the portion of the expanding ring which extends through the circumferential gap is perpendicular to the longitudinal axis.

3. The improvement of claim 1 wherein the coaxially and circumferentially aligned segments form an expanding ring and wherein the plane of at least one edge of the portion of the expanding ring which extends through the circumferential gap is inclined with respect to the longitudinal axis.

4. The improvement of claim 1 wherein the coaxially and circumferentially aligned segments form an expanding ring and wherein the contour of at least one edge of the portion of the expanding ring which extends through the circumferential gap is multiplanar.

5. The improvement of claim 1 wherein the coaxially and circumferentially aligned segments form an expanding ring and wherein the contour of at least one edge of the portion of the expanding ring which extends through the circumferential gap is curvilinear.

6. The improvement of claim 1 further comprising cooling means having two walls which are generally perpendicular to the longitudinal axis for cooling the thermoplastic piping after the gasket groove has been formed, and for limiting the axial width of the gasket groove during formation.

7. The improvement of claim 1 wherein the translating means comprise two members having geometrically shaped outer surfaces which extend varying distances from the horizontal axis and wherein the segments have a translating portion and a gasket groove forming portion, said translating portion having interfacing surfaces which ride on the outer surfaces of the translating means.

8. The improvement of claim 1 wherein the coaxially and circumferentially aligned segments form an expanding ring and further comprising motive means operably connected to said translating means to move said translating means for expanding and retracting the expanding ring.

9. The improvement of claim 8 having linking means operatively connected between said motive means and said translating means whereby the motive means can be located at a point distant from said translating means.

10. The improvement of claim 9 wherein the translating means comprise two or more geometric members and wherein said linking means can be selectively activated so that only one of the members traslates axially upon actuation of the motive means.

11. The improvement of claim 10 further comprising latching means for varying the ratio of axial movement of the translating means.

12. The improvement of claim 1 further comprising sliding sleeve assemblies fixedly secured to said translating means and detachably secured to said linking means whereby different groove depths and pipe sizes can be formed by selectively inserting the proper sized mandrel means and whereby the shape of the gasket groove can be varied by utilizing segments having differently shaped gasket groove forming head portions.

13. The improvement of claim 1 wherein said swage mandrel means and said gasket groove forming means are detachably secured as a unit to said translating means whereby different groove depths and pipe sizes can be formed by selectively inserting the proper size swage mandrel means and gasket groove forming means and whereby the shape of the gasket groove formed can be varied by utilizing segments having differently shaped gasket groove forming head portions.

14. The improvement of claim 1 wherein the translating means comprise two or more geometric members moving in opposite directions an equal amount so that expansion of the segments takes place radially in a plane perpendicular to the axis.

15. The improvement of claim 1 wherein the translating means comprise two geometric members and further comprising latching means to limit the travel of one of the geometric members so that expansion of the segments takes place both radially and axially.

16. The improvement of claim 15 wherein the latching means can be selectively activated whereby axial and radial expansion takes place simultaneously.

17. The improvement of claim 15 wherein the latching means can be selectively activated whereby axial and radial expansion takes place independently.

18. The improvement of claim 15 wherein the latching means can be selectively activated whereby axial and radial expansion takes place in one or more independent steps.

* * * * *